United States Patent [19]

Frazer, Jr. et al.

[11] Patent Number: 5,789,036
[45] Date of Patent: Aug. 4, 1998

[54] METHOD OF APPLICATION OF A SURFACE TREATMENT SOLUTION

[75] Inventors: Richard D. Frazer, Jr., Williamsville, N.Y.; Scott G. Howard, Stamford, Conn.

[73] Assignee: Crescent Marketing, Inc., Eden, N.Y.

[21] Appl. No.: 851,604

[22] Filed: May 5, 1997

Related U.S. Application Data

[62] Division of Ser. No. 556,577, Nov. 13, 1995, Pat. No. 5,626,653.

[51] Int. Cl.$^6$ .................................. B05D 3/10; B05D 3/12
[52] U.S. Cl. ............................................ 427/353; 427/369
[58] Field of Search .................................... 427/369, 353

[56] References Cited

U.S. PATENT DOCUMENTS

| | | |
|---|---|---|
| 3,104,175 | 9/1963 | Marx, Jr. et al. ............... 117/10 |
| 3,975,294 | 8/1976 | Dumoulin .......................... 252/354 |
| 4,218,250 | 8/1980 | Kasprzak ........................... 106/3 |
| 4,622,246 | 11/1986 | Takeuchi ........................... 427/327 |
| 4,632,848 | 12/1986 | Gosset et al. .................... 427/154 |
| 4,781,946 | 11/1988 | Takeuchi ........................... 427/327 |
| 4,900,592 | 2/1990 | Hahn, Jr. et al. ............... 427/375 |
| 4,913,967 | 4/1990 | Bilhorn ............................. 420/411 |
| 5,073,407 | 12/1991 | Frazer .............................. 427/160 |

FOREIGN PATENT DOCUMENTS 1148084  12/1966  United Kingdom .

*Primary Examiner*—Erma Cameron
*Attorney, Agent, or Firm*—Hodgson, Russ, Andrews, Woods & Goodyear LLP

[57] ABSTRACT

A method of treating a painted surface such as of vehicle or glass to form a film which protects the surface and can be easily cleaned, is described. A treatment solution including a non-water soluble surfactant mixed with water is rubbed onto the surface being protected until a tacky film forms on the surface. The tacky film is then rinsed from the surface until the surface is free of any streaks. The resulting protective film is beneficial to protect the surface against exposure to pollution, hand water deposits, acid contaminants, ultraviolet rays and the like.

31 Claims, No Drawings

METHOD OF APPLICATION OF A SURFACE TREATMENT SOLUTION

CROSS-REFERENCES TO RELATED APPLICATIONS

This application is a division of application Ser. No. 08/556,577 filed Nov. 13, 1995, now U.S. Pat. No. 5,626,653 to Frazer et al.

BACKGROUND OF THE INVENTION

1. Field of the Invention

The present invention generally relates to a method of treating a surface, and more particularly to a surface treatment solution used for window glass, painted surfaces such as an automobile finish and the like to provide a protective film that functions as an effective shield against spotting, staining and pitting caused by pollution, hard water deposits, ultraviolet rays and the like.

2. Prior Art

In recent years, there has been an increased concern over the damage caused to clear coat finishes such as on automobiles from exposure to pollution, hard water deposits, ultraviolet rays and the like. However, solvents and abrasives used for cleaning clear coat finishes can, in fact, harm such finishes. Silicone and other polymer resins can seal in contaminants, suffocate paint and interfere with proper curing and adhesion of new vehicle paint.

One product that effectively protects glass and painted surfaces and which is easily cleaned is described in U.S. Pat. No. 5,073,407 to Frazer and is incorporated herein by reference. This patent describes a treatment product comprising a surfactant mixed with water. Upon application to the surface to be treated, this prior art treatment product protects a painted surface against the effects of pollution and hard water deposits, in addition to its ultraviolet ray resistant qualities that provide continuous cleansing and neutralizing of contaminants. Similar beneficial qualities are realized for glass surfaces. These benefits are provided by rubbing the prior art treatment product into the surface being protected until a tacky residue forms on the surface. Then, the tacky residue is further rubbed into the surface until the surface is wiped free of any streaks.

While this product works well for its intended purpose, there is a need for a new and improved treatment solution that provides all the benefits of the prior art treatment product described in the Frazer patent without requiring the need for the final step of rubbing the tacky residue into the surface.

SUMMARY OF THE INVENTION

The surface treatment solution of the present invention is initially rubbed onto the surface finish until a greasy film is formed on the surface. An extraordinary aspect of the present surface treatment solution is that the greasy film rinses clear with ordinary tap water and dries spot-free without costly water softening apparatus and no hand drying. The resulting protective film or coating is effective against spotting, staining and pitting caused by pollution, hard water deposits, ultraviolet rays and the like.

DETAILED DESCRIPTION OF THE PREFERRED EMBODIMENTS

The method of treating a surface according to the present invention is effective on surfaces, such as the window glass of buildings and the paint finish of an automobile, to remove dirt, dust, grime and neutralize contaminants such as acid rain. Further, the surface, such as the glass of buildings, preferably commercial buildings, or an automobile paint finish, having been cleaned by the present surface treatment solution has a protective coating thereon. The protective coating dramatically reduces spotting, staining and pitting on the cleaned surface caused by pollution and hard water deposits. The present protective coating also has been found to improve the resistance of automobile paint to degradation from ultraviolet rays. Accordingly, the paint finish of the automobile lasts longer and naturally retains its bright finish for a longer period of time.

The surface treatment solution of the present invention comprises a non-soluble, water dispersible liquid surfactant. A preferred surfactant is butanedioic acid, sulfo-1,4-dioctyl ester, sodium salt. Since this surfactant is relatively insoluble, it is typically provided in a 10% ethanol, 20% water solution. The ethanol/water solution helps to decrease the viscosity of the surfactant for uniform application over the entire surface to be treated. This surfactant is sold under the tradename GEROPON WT-27 by Rhone-Poulenc Surfactants & Specialties, Cranbury, N.J. This surfactant exhibits wetting, foaming, dispensing, detergent and emulsification properties over a wide range of water hardness. GEROPON WT-27 has the following physical properties:

BOILING POINT: 85.00° C.

VAPOR PRESSURE: DUE TO 30% WATER/ETHANOL

VAPOR DENSITY (AIR=1): DUE TO 30% WATER/ETHANOL

WATER SOLUBILITY: SLIGHT

MELTING/FREEZING POINT: NO DATA FOUND

APPEARANCE: CLEAR, COLORLESS LIQUID

SPECIFIC GRAV. (WATER=1): 1.08

PERCENTAGE VOLATILES: 10% ETHANOL; 20% WATER

EVAPORATION RATE: >1.00 (BU. ACET.=1)

pH OF SOLUTION: 5.00–6.00 1% SOLUTION

ODOR: SLIGHT ALCOHOLIC ODOR

FLASH POINT: 82.00° F. (PMCC)

AUTOIGNITION TEMP.: 685.00° F. (ETHANOL)

FLAMMABLE LIMITS: 3.30% to 19.00% (ETHANOL)

Another preferred surfactant for inclusion in the surface treatment solution of the present invention comprises a fluorochemical surfactant and the preferred fluorochemical surfactant is sold under the tradename FC-129 FLUORAD by 3M Corporation, St. Paul, Minn. FC-129 FLUORAD comprises potassium fluoroalkyl carboxylate and 2-butoxyethanol and it has the following physical properties:

BOILING POINT: 100° C.

VAPOR PRESSURE: 28 mm Hg @ R.T.

VAPOR DENSITY (AIR=1): 0.7 @ R.T.

WATER SOLUBILITY: COMPLETE

APPEARANCE: YELLOW TO AMBER LIQUID

SPECIFIC GRAV. (WATER=1): 1.3

PERCENTAGE VOLATILES: 50%

EVAPORATION RATE: <1.0 pH OF SOLUTION: 11

ODOR: BUTYL CELLOSOLVE

FLASH POINT: 38° C. (PMCC)

For applications of the present surface treatment solution to the painted surface of a motor vehicle or similar apparatus, window glass or similar glass surfaces and the like, the surfactant can be applied directly to the surface. However, the surfactant, whether the surfactant is GEROPOM WT-27 or FC-129 FLUORAD, in their undiluted state are very sticky and relatively difficult to apply to the surface intended to be treated. Thus, it has been found preferable to mix up to about 15%, by volume, of surfactant with the remainder of the total volume being water. More preferably, it has been found that an effective surface treatment solution contains between about 10% to 17%, by volume, of surfactant to the total solution volume. As the percentage of volume of surfactant to water decreases below about 5%, the solution loses its beneficial effect and is believed to degenerate too quickly.

Acid particles and other contaminants can become trapped under conventional paint sealants and auto polishes. When these trapped particles are exposed to sunshine, the damage they cause to the paint can actually accelerate. To markedly diminish and in some cases eliminate the damage that trapped acidic contaminants can cause, the surface treatment solution of the present invention preferably includes a water dispersible acid neutralizing agent. Specifically, the preferred acid neutralizing compound is an alkoxylated alkanol amide sold under the tradename MAKON NF-5 by Stepan Company, Northfield, Ill. This compound exhibits low foaming properties even under extreme agitation, has excellent wetting action and an alkaline state. The pH of this acid neutralizing agent is between about 8.5 to 10.5 (5%, by volume, in $H_2O$). These properties aid in water sheeting, foam reduction and acid absorption.

It is preferred to mix up to about 4% by volume, of the acid neutralizing agent in the surfactant/water solution. More preferably, it has been found that an effective surface treatment solution contains between about 2% to 7%, by volume, of the acid neutralizing agent.

MAKON NF-5 has the following physical and chemical characteristics:

BOILING POINT: OVER 212° F. (100° C.)
% VOLATILE BY WEIGHT: 3%
EVAPORATION RATE: EST. SLOWER THAN ETHYL ETHER
VAPOR DENSITY: EST. LIGHTER THAN AIR
VAPOR PRESSURE (mm Hg): NOT DETERMINE OR UNKNOWN
WEIGHT PER GALLON: 8.3 LBS.
FLASH POINT: 93° C. (PMCC)

In addition to protecting against trapped acid particles, the inclusion of MAKON NF-5 to the present surface treatment solution increases the resulting protective film or coating from acid rain and the like. In that light, the various additives comprising the present surface treatment solution are preferably formulated to provide a solution pH of about 8.9.

It is envisioned that the present surface treatment solution will be marketed in various sized containers intended for both household and industrial consumption. Foaming is a particularly vexing problem during the filling operation and to prevent this, the surface treatment solution of the present invention preferably includes an anti-foam ingredient that reduces bubbles during bottling, application and use. The preferred anti-foam agent for this purpose is a non-silicone anti-foam emulsion sold under the tradename FOAMGARD 1000 by Rhone-Poulenc Surfactants & Specialties, Cranbury, New Jersey. This emulsion has the following properties:

BOILING POINT 76° mm Hg: 260°–316° C.
SPECIFIC GRAVITY ($H_2O$=1): 0.88 @ 25° C.
FREEZING POINT: <0°C.
VAPOR PRESSURE AT 20° C.: <0.8 mm Hg
VAPOR DENSITY (AIR=1): >1
EVAPORATION RATE: <1 (BU. ACET. =1)
SOLUBILITY IN WATER BY WT: Dispersible
APPEARANCE: Opaque off white
ODOR: Mild
PHYSICAL STATE: Liquid It is preferred to mix up to about 0.02%, by volume, of the anti-foam agent in the present surface treatment solution. More preferably, it has been found that the formation of bubbles during filling is most effectively prevented when the surface treatment solution contains between about 0.02% to 0.06%, by volume, of the anti-foam agent.

The preferred formulation of the present surface treatment solution further contains a pH buffering agent. Specifically, the preferred compound for this purpose is a cocamidopropyl bentaine sold under the tradename Mirataine CB by Rhone-Poulenc Surfactants & Specialties, Cranbury, N.J. The pH buffering agent helps to increase the viscosity and mollifies any irritation caused by other ingredients of the present surface treatment solution. Mirataine CB also lowers the surface tension of the present surface treatment solution to aid in its sheeting action. This compound is preferably present in a concentration of between about 3% to 8%, and more preferably at a concentration of about 6%. Mirataine CB has the following physical and chemical characteristics:

BOILING POINT: 100° C.
FREEZING POINT: <0° C.
SPECIFIC GRAVITY ($H_2O$=1): 1.05 @ 25
PERCENT VOLATILE: 65%
pH: 8.5
APPEARANCE AND ODOR: Slightly viscous, pale yellow liquid, faint fruity odor To demonstrate the efficiency of the present surface treatment solution, the present solution comprising the GEROPON WT-27 surfactant, MAKON NF-5 acid neutralizing compound, FOAMGARD 1000 non-silicone anti-foam emulsion and Mirataine CB pH buffering agent was applied to a painted panel, as previously described, to provide a protective film thereon and the protected panel was exposed to various exposure conditions. The conditions of exposure ranged from tap water to pH 3 and pH 4 acid solutions to simulate acid rain conditions, and a 1% egg albumen solution. Specifically, the test panels were subjected to one droplet each of tap water, 1% egg albumen solution diluted with water pH 3 acid rain solution, and a pH 4 acid rain solution. The acid rain solutions comprised a 10:1 ratio of sulfuric acid to nitric acid diluted to the appropriate pH with tap water. The variously treated panels were stored at 140° F. for two (2) hours after the application of each droplet, removed from the heat chamber, stabilized and evaluated for damage. The results of these tests are shown in Table 1.

TABLE 1

| COATING | pH3 ACID RAIN SIMULATION | pH4 ACID RAIN SIMULATION | 1% EGG ALBUMIN | TAP WATER |
|---|---|---|---|---|
| PRESENT SOLUTION | No Noticeable Damage | No Noticeable Damage | No Noticeable Damage | No Noticeable Damage |
| Uncoated Paint | Etched Ring | Etching | Etched Ring | Etched Ring |

Each of the panels exhibited some residue at the perimeter of the droplet area. When the residue left by the drying process was wiped away, the panel coated with the present surface treatment solution exhibited no damage to the painted surface. The uncoated panels exhibited etching under each test regime. Thus, the present surface treatment solution has properties that enhance its buffering ability to prevent damage to the treated surface from acid rain and the like.

The surface treatment solution of the present invention further comprises a water soluble anti-microbial agent. Without the inclusion of this additive, it is possible that the other ingredients of the present surface treatment solution can provide a sufficient nutrient base to support bacteria growth. Bacteria growth can render the solution ineffective for its intended purpose as a surface treatment for window glass and painted surfaces of an automobile and the like. Specifically, the preferred anti-microbial agent is 1,3-dioxin-4-ol-2,6-dimethyl acetate. This compound is sold under the tradename GIV-GARD DXN by Givaudan Corporation, Clifton, N.J. This additive preserves the integrity of the surface treatment solution prior to use and is preferably present in the solution in an amount of between about 0.05% to 0.20%, by volume. The GIV-GARD DXN anti-microbial agent has the following characteristics:

PHYSICAL STATE: LIQUID
COLOR: CLEAR YELLOW TO LIGHT AMBER
ODOR: PUNGENT
SOLUBILITY IN WATER: 100% WITH AGITATION
BOILING-POINT (°C): 66°–68° C. @ 3 mm Hg
VAPOR-PRESSURE (mm Hg @ 25° C.): N/A
MELTING POINT (°C): NOT APPLICABLE
SPECIFIC GRAVITY ($H_2O$=1.0): 1.068 @ 25° C.
REFRACTIVE INDEX @ 20° C.: 1.4340
FLASH POINT: 125° F.

The surface treatment compound of the present invention further preferably includes an additive which causes the surface coating to be resistant to ultraviolet ray deterioration. The additive for this purpose is an ultraviolet stabilizer such as UNIVUL N-539 sold by BASF Corporation, Chemicals Division of Rensselear, N.Y. This additive has a formulation of 2-ethylhexyl-2-cyano-3,3-diphenylacrylate and the following properties:

PHYSICAL FORM: Liquid
MOLECULAR WEIGHT: 361
MELTING POINT: −10° C.
COLOR: Pale Yellow
SPECIFIC GRAVITY: 1.0478
% PURITY: 94
SOLUBILITY: (% by Weight, 30° C.)
WATER: Immiscible
METHANOL: Miscible
ETHYL ACETATE: Miscible
MEK: Miscible
TOLUENE: Miscible The ultraviolet stabilizer additive can be added to the treatment solution of surfactant, water and the other previously described additives in a preferred range of between about 0.1% to 1%, by volume, to the total solution volume. A more preferred range is between about 0.1% to 0.5%, by volume, of the ultraviolet stabilizer additive and a most preferred amount is about 0.2%, by volume, to the total solution volume. Below about 0.1% of the total solution volume, no significant results have been found. It is further within the terms of the present invention to provide an operable surface treatment compound without the ultraviolet stabilizer additive.

Prior to applying the present surface treatment solution to the finished surface of, for example, a vehicle, the surface to be treated should preferably be prepared so as to be clean, dry and free from wax and other coatings. Immediately after the present treatment solution has been applied and before it has a chance to dry, it is rubbed into the surface using a firm, circular motion of an application cloth until the solution is spread evenly over the surface being treated. After rubbing, the surface should be covered with a greasy but not gummy film. The steps of applying and rubbing are continued until the solution is applied to each section of the vehicle, such as the trunk, hood, etc.

The greasy film dries tacky. The tacky film is then rinsed by thoroughly spraying the treated surface with ordinary tap water until the film disappears and a glossy finish is achieved. It is believed, however, that a coating of the surface treatment solution remains on the surface being treated.

The paint of a vehicle finish which has been treated with the present surface treatment solution will effectively resist acid and alkaline pollution, hard water deposits, excessive heat and cold, harsh sunlight, detergent washing and salt water immersions. Then, to clean a surface treated coated car, simply spraying water through a hose will remove the surface dirt, and light rubbing with a cloth or sponge will remove dirt that accumulates during driving. The car can be rinsed with ordinary tap water and will dry spot free without the need of hand-drying.

While the surface treatment solution of present invention is particularly useful for applications to vehicles such as automobiles, it can also be effectively used in treating glass windows of buildings, such as commercial buildings and residences. Treating glass windows can be particularly beneficial because the treated glass sheds dirt and spots and dramatically reduces cleaning and maintenance. Prior to applying the surface treatment solution to a window glass, the glass surface should preferably be clean and dry. Then a small amount of the solution is rubbed onto the glass using firm, back and forth directional movements. Typically these movements are in a horizontal direction but any direction will suffice. The treated surface should appear greasy but not gummy. The surface is then allowed to dry for a period of about ten or more minutes until a tacky film forms. Although not required, it is preferred to again apply the solution to the window glass using a motion substantially perpendicular to the first movements. Assuming the first movements to be in a horizontal direction, these second movements would be in the vertical direction. The surface is again allowed to dry for a period of about ten minutes or more until the surface has a tacky film thereon.

To remove the tacky film the treated glass is rinsed by thoroughly spraying the treated surface with ordinary tap water. Then, the water is allowed to air dry or the water is removed with a rubber squeegee. The substantially non-distorting, clear surface treatment solution forms a coating on the glass which sheds dirt and spots and dramatically reduces cleaning maintenance.

Besides the beneficial ease of cleaning, the present treatment solution contains no solvents, abrasives, or silicone and it is 100% biodegradable. Moreover, the present surface treatment solution is safe for hands, the environment and the window trim.

In areas subjected to large amounts of dirt, the previously treated areas can be maintained by simply spraying concentrated surfactant, preferably GEROPON WT-27 or FC-129

FLUORAD, through a siphon container attached to a hose. After this treatment, no wiping or drying is necessary.

It is apparent that there has been provided in accordance with this invention a method of treating a surface which fully satisfies the objects, means and advantages set forth hereinbefore. While the invention has been described in combination with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

What is claimed is:

1. A method of treating a surface to form a protective coating consisting essentially of a surfactant, thereon, comprising the steps of:
   a) mixing the surfactant with a solvent that reduces the viscosity of the surfactant and a acid neutralizing agent to form a treatment solution, wherein the surfactant is selected from the group consisting of butanedioic acid, sulfo-1,4-dioctyl ester, sodium salt and a fluorochemical surfactant comprising potassium fluoroalkyl carboxylate;
   b) applying the treatment solution to the surface to be protected to thereby wet the surface;
   c) rubbing the solution wetted surface until a tacky film forms on the surface; and
   d) rinsing the tacky film from the wetted surface so that all that remains on the surface is the protective coating consisting essentially of the surfactant, wherein the acid neutralizing agent prevents acidic contaminants present on the surface prior to application of the treatment solution from damaging the surface treated with the solution.

2. The method of claim 1 including mixing the surfactant in an amount of between about 5% to 17%, by volume, of the treatment solution.

3. The method of claim 1 wherein the coated surface is free of streaking.

4. The method of claim 1 further including the step of cleaning the surface to be coated prior to wetting the surface.

5. The method of claim 1 wherein the step of rubbing the solution wetted surface includes using a firm circular motion until the surface is covered with the tacky film.

6. The method of claim 1 wherein the surface being treated is a painted surface.

7. The method of claim 1 wherein the surface being treated is a glass surface.

8. The method of claim 1 wherein the acid neutralizing agent is an alkoxylated alkanol.

9. The method of claim 1 including providing the solution having a pH of about 8.9.

10. The method of claim 1 further including an ultraviolet stabilizer.

11. The method of claim 1 further including an anti-foam agent.

12. The method of claim 11 wherein the anti-foam agent is a nonsilicone emulsion.

13. The method of claim 1 further including an anti-microbial agent.

14. The method of claim 13 wherein the anti-microbial agent is 1,3-dioxin-4-ol-2,6-dimethyl acetate.

15. The method of claim 1 further including a pH buffering agent.

16. The method of claim 15 wherein the pH buffering agent is a cocamidopropyl bentaine.

17. A method of treating a surface, comprising the steps of:
   a) mixing a non-water soluble surfactant with water to form a treatment solution wherein the surfactant is selected from the group consisting of butanedioic acid, sulfo-1,4-dioctyl ester, sodium salt and a fluorochemical surfactant comprising potassium fluoroalkyl carboxylate present in the solution in an amount of about 5% to 17%, by volume;
   b) mixing an acid neutralizing agent, an ultraviolet stabilizer, an anti-foam agent, an anti-microbial agent and a pH buffering agent with the water and the surfactant;
   c) wetting the surface to be protected by applying the treatment solution thereto;
   d) rubbing the solution wetted surface until a tacky residue forms on the surface; and
   e) rinsing the tacky residue from the wetted surface so that all that remains on the surface is the protective coating consisting essentially of the surfactant, wherein the acid neutralizing agent prevents acidic contaminants present on the surface prior to application of the treatment solution from damaging the surface treated with the solution.

18. The method of claim 17 wherein the step of mixing further includes mixing between about 2% to 7%, by volume, of the acid neutralizing agent.

19. The method of claim 18 wherein the acid neutralizing agent is an alkoxylated alkanol.

20. The method of claim 17 wherein the step of mixing further includes mixing between about 0.1% to 1.0%, by volume, of the ultraviolet stabilizer.

21. The method of claim 17 wherein the step of mixing further includes mixing between about 0.02% to 0.06%, by volume, of the anti-foam agent.

22. The method of claim 21 wherein the anti-foam agent is a nonsilicone emulsion.

23. The method of claim 17 wherein the step of mixing further includes mixing between about 0.05% to 0.20%, by volume, of the anti-microbial agent.

24. The method of claim 23 wherein the anti-microbial agent is 1,3-dioxin-4-ol-2,6-dimethyl acetate.

25. The method of claim 17 wherein the step of mixing further includes mixing between about 3% to 8%, by volume, of the pH buffering agent.

26. The method of claim 25 wherein the pH buffering agent is a cocamidopropyl bentaine.

27. The method of claim 17 wherein the step of rubbing the tacky residue includes rubbing a cloth against the surface with a firm circular motion.

28. The method of claim 17 wherein the surface being treated is the finished surface of an automobile.

29. The method of claim 17 wherein the surface being treated is a painted surface.

30. The method of claim 17 wherein the coated surface is free of streaking.

31. The method of claim 17 including the step of cleaning the surface prior to wetting the surface.

* * * * *